United States Patent Office 3,409,386
Patented Nov. 5, 1968

3,409,386
REACTION OF HALOCYCLOALKENYL ACYL HALIDE WITH POLYESTERS, POLYAMIDES AND TEXTILES
Herman S. Bloch, Skokie, and Louis Schmerling, Riverside, Ill., assignors to Universal Oil Products Company, Des Plaines, Ill., a corporation of Delaware
No Drawing. Filed Oct. 1, 1964, Ser. No. 400,933
18 Claims. (Cl. 8—94.21)

ABSTRACT OF THE DISCLOSURE

Natural or synthetic textiles and non-textile polymers or prepolymers are treated with a halo-substituted cycloalkenylacyl halide to impart flame retardance thereto. For example, cotton, wool, polyesters and polyamides may be treated with 1,4,5,6,7,7-hexachloro-5-norbornen-2-ylacetyl chloride or the analogous bromine substituted compound. Also, leather, nylon and rayon fibers and unshaped alkyl resins, adipic acid-diethylenetriamine polyamide are treated by the above acyl halide also polyesters are made from propylene glycol (modified by the above acyl halide) and maleic anhydride.

This invention relates to a process for the treatment of polymeric compositions of matter and particularly to a process for the treatment of polymeric compositions of matter possessing a certain configuration whereby the treated polymer will possess desirable properties.

The increased use of certain polymeric compositions of matter, either naturally occurring or synthetic in origin, such as resins, plastics, textiles including rayon, nylon, etc., wool, leather, cotton, etc., or other cellulosic products such as paper, in situations where the finished article is normally subject to excessive heat or the possibility of contact with an open flame necessitates the advisability of having these articles as resistant to flame as is possible. For example, certain resins or plastics when molded or formed may be used as receptacles for electrical contacts, for architectural paneling, as bodies for airplanes, cars, boats, etc. or, in addition, textiles may be used for male and female clothing, etc. It is therefore desirable that the finished product, either resins, plastics, or textiles, should possess the property of being flame retardant or flame resistant. In order to render the article of commerce resistant or retardant to flame, the article should contain, either as an element thereof or by impregnation therewith, some compound which will impart the aforesaid property of flame resistance or flame retardance to the specific article. In this respect it has now been discovered that certain compositions of matter will, when added to a certain polymeric substance of the type hereinafter set forth in greater detail, impart the desirable property of flame resistance or flame retardance to the aforementioned article.

It is therefore an object of this invention to provide a process for treating certain polymeric compositions of matter whereby desirable properties will be imparted thereto.

A further object of this invention is to provide a process for treating certain naturally occurring or synthetic polymeric substances by reacting said substance with certain compositions of matter whereby flame retardancy will be imparted to the substance.

In a broad aspect one embodiment of this invention resides in a process for the treatment of a polymeric substance selected from the group consisting of naturally occurring and synthetic polymers containing hydrogen which is replaceable by reaction with an acid halide, said process comprising reacting said subtsance with a halo-substituted cycloalkenylacyl halide, and recovering the resultant treated substance.

A further embodiment of this invention is found in a process for the treatment of a polymeric substance selected from the group consisting of naturally occurring and synthetic polymers containing hydrogen which is replaceable by reaction with an acid chloride, said process comprising reacting said substance with a chloro-substituted cycloalkenylacyl chloride, and recovering the resultant treated substance.

A specific embodiment of this invention is found in a process for the treatment of wool which comprises reacting wool with a halo-substituted cycloalkenylacyl halide, and recovering the resultant treated wool.

A more specific embodiment of this invention resides in a process for the treatment of cotton which comprises reacting said cotton with 1,4,5,6,7,7-hexachloro-5-nor-bornen-2-ylacetyl chloride, and recovering the resultant treated cotton.

Other objects and embodiments will be found in the following further detailed description of this invention.

As hereinbefore set forth, it has now been discovered that certain polymeric compositions of matter, both naturally occurring and synthetic in nature, may be made more resistant or retardant to flame by incorporating therewith certain compositions of matter which are generically referred to in the present specification and appended claims as halo-substituted cycloalkenylacyl halides. These compounds which possess the desired property of flame retardancy may be prepared by reacting a halo-substituted alkadiene or cycloalkadiene with an unsaturated acid halide containing at least one hydrogen atom on each of the doubly-bonded carbon atoms. This reaction is effected at elevated temperatures ranging from about 100° to about 250° C. and preferably in a range of from about 125° to about 175° C. If so desired, the reaction may be effected in the presence of a substantially inert organic solvent or diluent such as aromatic hydrocarbons, including benzene, toluene, the xylenes, ethylbenzene, etc., or paraffinic hydrocarbons, both alicyclic and cyclic in nature, such as n-pentane, n-hexane, n-heptane, cyclopentane, cyclohexane, methylcyclopentane, etc.

Cycloalkadienic compounds which may be used and which contain halogen substituents, said compounds containing only carbon, hydrogen and halogen atoms, possess the generic formula:

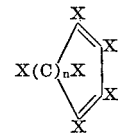

in which the X's are independently selected from the group consisting of hydrogen or halogen radicals having an atomic weight of from 35 to 127 (i.e., chlorine, bromine or iodine), at least one of the X's being halogen, and n is an integer of from 1 to 2. Representative compounds include 1-chlorocyclopentadiene,
1,2-dichlorocyclopentadiene,
1,2,3-trichlorocyclopentadiene,
1,2,3,4-tetrachlorocyclopentadiene,
1,2,3,4,5-pentachlorocyclopentadiene,
hexachlorocyclopentadiene,
1-bromocyclopentadiene,
1,2-dibromocyclopentadiene,
1,2,3-tribromocyclopentadiene,
1,2,3,4-tetrabromocyclopentadiene,
1,2,3,4,5-pentabromocyclopentadiene,
hexabromocyclopentadiene,
1-iodocyclopentadiene,
1,2-diiodocyclopentadiene,
1,2,3-triiodocyclopentadiene,
1,2,3,4-tetraiodocyclopentadiene,
1,2,3,4,5-pentaiodocyclopentadiene,
hexaiodocyclopentadiene, etc. It is also contemplated that polyhalo-substituted conjugated cyclohexadienes such as 1,2-dichloro-1,3-cyclohexadiene,
1,2,3-trichloro-1,3-cyclohexadiene,
otachloro-1,3-cyclohexadiene, etc.,
1,2-dibromo-1,3-cyclohexadiene,
1,2,3-tribromo-1,3-cyclohexadiene,
octabromo-1,3-cyclohexadiene,
1,2-diiodo-1,3-cyclohexadiene,
1,2,3-triiodo-1,3-cyclohexadiene,
octaiodo-1,3-cyclohexadiene, etc. may also be used. In addition, it is also contemplated that the polyhalocycloalkadienes which may be used in preparing the treating agent of this process may contain more than one species of halo substituents such as, for example, 1-chloro-2-bromocyclopentadiene, 1,2-dichloro-3-bromocyclopentadiene, 1,2-dichloro-5,5-dibromocyclopentadiene, etc., although not necessarily with equivalent results.

It is also contemplated that other halo-substitued compounds may be condensed or reacted with the unsaturated acid halide which is characterized by containing at least one hydrogen atom on each of the doubly-bonded carbon atoms. For example, halogenated conjugated open-chain diolefins containing only carbon, hydrogen and halogen atoms such as 1-chloro-1,3-butadiene,
1,3-dichloro-1,3-butadiene,
1-bromo-1,3-butadiene,
1,3-dibromo-1,3-butadiene,
1-iodo-1,3-butadiene,
1,1,3-trichloro-1,3-butadiene,
1,1,3-triiodo-1,3-butadiene,
1,1,2-trichloro-1,3-butadiene,
1,1,4-tribromo-1,3-butadiene,
1,1,4,4-tetrachloro-1,3-butadiene,
1,1,4,4-tetrabromo-1,3-butadiene,
1,1,4,4-tetraiodo-1,3-butadiene,
1,3-dichloro-2-methyl-1,3-butadiene,
1,4-dichloro-2-methyl-1,3-butadiene,
1,1,4,4-tetrachloro-2-methyl-1,3-butadiene,
1,1,4,4-tetrabromo-2-methyl-1,3-butadiene,
1,4-diiodo-2-iodomethyl-1,3-butadiene,
1,1-dichloro-3-bromo-1,3-butadiene,
1-chloro-3-bromo-1,3-butadiene,
1-iodo-3-chloro-1,3-butadiene,
2-bromo-3-chloro-1,3-butadiene,
1,4-dichloro-2-bromomethyl-1,3-butadiene,
1,4-dichloro-2-iodomethyl-1,3-butadiene, etc. may also be used.

The unsaturated acid halides which are used in preparing the treating agents are characterized by containing at least one hydrogen atom on each of the doubly-bonded carbon atoms; they include monobasic acid halides such as acrylyl chloride, acrylyl bromide, vinylacetyl chloride, vinylacetyl bromide, crotonyl chloride, crotonyl bromide, propylideneacetyl chloride, propylideneacetyl bromide, ethylidenepropionyl chloride, ethylidenepropionyl bromide, allylacetyl chloride, allylacetyl bromide, etc.; unsaturated dibasic acid halides such as maleoyl monochloride, maleoyl dichloride, maleoyl monobromide, maleoyl dibromide, fumaryl monochloride, fumaryl dichloride, fumaryl monobromide, fumaryl dibromide, glutaconyl monochloride, glutaconyl dichloride, glutaconyl monobromide, glutaconyl dibromide, allylmalonyl monochloride, allylmalonyl monobromide, allylmalonyl dibromide, propenylmalonyl monochloride, propenylmalonyl dichloride, propenylmalonyl monobromide, propenylmalonyl dibromide, allylsuccinyl monochloride, allylsuccinyl dichloride, allylsuccinyl monobromide, allylsuccinyl dibromide, etc.

In addition, it is further contemplated that conjugated straight-chain and cyclic diolefinic hydrocarbons containing only carbon and hydrogen atoms such as 1,3-butadiene, 2-methyl-1,3-butadiene, 1,3-cyclopentadiene, etc. may be condensed with the unsaturated acid halides of the type hereinbefore set forth and the resulting product is then condensed with one of the halogenated dienes, particularly hexachlorocyclopentadiene, above described.

The compounds resulting from the reaction between the halo-substituted alkadienic or cycloalkadienic compound with an unsaturated acid halide which contains at least one hydrogen atom on each of the doubly-bonded carbon atoms are halo-substituted cycloalkenylacyl halides, a term which for purposes of this invention, as used in the present specification and appended claims, includes halo-substituted mono-, bi- and polycycloalkenylacyl halides. Such compounds include 2,3-dichloro-3-cyclohexenylacetyl chloride,
2,3-dichloro-3-cyclohexenylacetyl bromide
2,3,4,5-tetrachloro-3-cyclohexenylacetyl chloride,
2,3,4,5-tetrachloro-3-cyclohexenylacetyl bromide,
2,3,4,5-tetrabromo-3-cyclohexenylacetyl chloride,
2,3,4,5-tetrabromo-3-cyclohexenylacetyl bromide,
2,3-dichloro-3-cyclohexenylcarbonyl chloride,
2,3-dichloro-3-cyclohexenylcarbonyl bromide,
2,3,4,5-tetrachloro-3-cyclohexenylcarbonyl chloride,
2,3,4,5-tetrachloro-3-cyclohexenylcarbonyl bromide, etc.,
1,4-dichloro-5-norbornen-2-ylacetyl chloride,
1,4-dichloro-5-norbornen-2-ylacetyl bromide,
1,4,5,6,7,7-hexachloro-5-norbornen2-ylacetyl chloride,
1,4,5,6,7,7-hexachloro-5-norbornen-2-ylacetyl bromide,
1,4,5,6,7,7-hexabromo-5-norbornen-2-ylacetyl chloride,
1,4,5,6,7,7-hexabromo-5-norbornen-2-ylacetyl bromide,
1,4-dichloro-5-norbornen-2-carbonyl chloride,
1,4-dichloro-5-norbornen-2-carbonyl bromide,
1,4,5,6,7,7-hexachloro-5-norbornen-2-carbonyl chloride,
1,4,5,6,7,7-hexachloro-5-norbornen-2-carbonyl bromide,
1,4,5,6,7,7-hexabromo-5-norbornen-2-carbonyl-chloride,
1,4,5,6,7,7-hexabromo-5-norbornen-2-carbonyl bromide,
1,4-dichloro-3-methyl-5-norbornen-2-carbonyl chloride,
1,4-dichloro-3-methyl-5-norbornen-2-carbonyl bromide,
1,4,5,6,7,7-hexachloro-3-methyl-5-norbornen-2-carbonyl chloride,
1,4,5,6,7,7-hexachloro-3-methyl-5-norbornen-2-carbonyl bromide,
1,4,5,6,7,7-hexabromo-3-methyl-5-norbornen-2-carbonyl chloride,
1,4,5,6,7,7-hexabromo-3-methyl-5-norbornen-2-carbonyl bromide, etc.

Examples of naturally occurring and synthetic polymers which may be treated with a halo-substituted cycloalkenylacyl halide to render said polymers resistant to flame comprise those polymers which contain hydrogen which is replaceable by reaction with an acid halide. Specific examples of these polymers will include naturally occurring textiles such as cotton or wool, leather, synthetically prepared fibers such as rayon, nylon, etc., or plastics and resins which are characterized by the presence of hydroxy, thiol or amino groups, these latter groups containing the hydrogen which is replaceable by reaction with the acid chloride group of the halo-substituted cycloalkenylacyl halide. It is also contemplated within the scope of this invention that polymers such as polystyrene may also be treated with the halo-substituted cycloalkenylacyl halide in the presence of a metal halide catalyst of the Friedel-Crafts type to prepare fire retardant polymeric compositions of matter.

When a naturally occurring or synthetic fiber, film or textile is to be treated with a halo-substituted cycloalkenylacyl halide to render said fiber or textile more resistant or retardant to flame, the process may be effected in either a continuous or batch type operation. For example, when a batch type operation is used, a quantity of the halo-substituted cycloalkenylacyl halide, preferably dissolved in an inert solvent, is placed in an appropriate apparatus such as a dipping vat, pan, tray or trough. In the preferred embodiment of the invention, there is added to the solution a sufficient amount of a basic material such as sodium carbonate, calcium carbonate, potassium carbonate, etc. to neutralize the acidic constituents which are formed during the treatment. The inert organic solvent or diluent may be suitably be n-pentane, n-heptane, benzene, etc. The fibrous material, film or textile is immersed in the solution of acyl halide and solvent for a sufficient length of time to be thoroughly wetted, said period of time ranging from about 15 seconds up to about 5 minutes, the preferred time being from about 30 to about 60 seconds. Following this, the material is removed from the bath and excess solution is removed by any conventional means such as by padding, centrifuging, extracting, etc. The recovered fiber, film, fabric or textile may then be heated to a temperature between 25° C. and 150° C. or more to complete the reaction of the halide with the material, after which it is washed, dried or subjected to any further treatment which is desired such as dyeing, etc.

In the preferred embodiment of this invention the treatment of the fibrous material is effected in a continuous manner. The fibrous material or textile is passed through a solution of the acyl halide and solvent, said passage being effected by a continuous immersion through a bath of the solution or by passage of the material through a spraying zone, the immersion in the bath or the passage through the spraying zone being of a sufficient duration to insure a complete wetting of the fibrous material. The wetted material is then treated in a manner similar to that hereinbefore set forth to remove excess solution and effect complete reaction, and is thereafter washed, dried, etc.

In addition to treating fibrous materials or textiles of natural origin to endow the same with fire retardant properties, the halo-substituted cycloalkenylacyl halides may also be admixed with certain synthetically prepared polymers containing hydrogen which is replaceable by reaction with an acid halide, said polymers containing functional groups such as hydroxy, thiol or amino groups. It is contemplated within the scope of this invention that the acyl halide may be utilized to endow these polymers with the necessary properties by either treating prepolymers which contain replaceable hydrogen or by formulating the polymer in situ utilizing the acyl halide as one component of the finished product. For example, the acyl halide may be utilized as a component of a polyester, said polyesters which are thus prepared comprising low molecular weight compounds which can be utilized as molding resins, coating materials, plasticizers, etc. In addition, low molecular weight polyesters may also be epoxidized and used as stabilizing plasticizers for polyvinyl chloride resins. Other types of plastics or resins which are polymeric in nature which may be prepared include polyurethane foams, or if so desired, the halo-substituted cycloalkenylacyl halides may be reacted with polyamines to form partially amidized amino components of polyamides. When the resulting polyamide is a low molecular weight compound, that is, a compound having a molecular weight of about 2,000 or less, the resulting resin may be used as an adhesive; if the resulting polyamide is a high molecular weight compound and is linear in nature, the compound may be used as a molding resin or as a fiber or film former.

When the halo-substituted cycloalkenylacyl halide is reacted with a compound which may be generically termed a prepolymer, that is, a compound which is polymeric in nature and which contains hydrogen capable of being replaced by an acid halide such as polyols, polyamines, etc., the acyl halide will act to a certain extent as a condensation controlling agent and thus enable the finished product to possess the desired average molecular weight and physical characteristics as well as properties of fire resistance or fire retardance.

The prepolymers which contain replaceable hydrogen and the halo-substituted cycloalkenylacyl halide may be reacted in any manner known in the art, the reaction conditions such as temperature and pressure being dependent upon the particular compounds undergoing curing or cross-linking. Usually the curing or cross-linking of the prepolymer with the particular halo-substituted cycloalkenylacyl halide will be effected at temperatures ranging from room temperature (about 25° C.) up to about 300° C. or more in the presence of a mildly alkaline neutralizing agent. In addition, the acyl halide will be present in the finished reaction product in various concentrations, ranging from about 5% up to about 50% or more of the finished product, the particular concentration being dependent upon the particular use to which the finished polymeric product will be put.

The following examples are given to illustrate the process of the present invention which, however, are not intended to limit the generally broad scope of the present invention in strict accordance therewith.

EXAMPLE I

A mixture of 135 grams (0.5 mole) of hexachlorocyclopentadiene and 51.5 grams (0.5 mole) of vinylacetyl chloride was dissolved in 25 cc. of xylene and the solution was placed in a condensation apparatus provided with heating and refluxing means. The solution was then heated under reflux, the temperature rising from about 122° to about 154° C. during a period of about 6 hours. The temperature was maintained at 154° C. for an additional period of about 1.5 hours during which time some hydrogen chloride was evolved. At the end of this time the flask and contents thereof were allowed to cool to room temperature after which the reaction mixture was subjected to fractional distillation under reduced pressure. The cut boiling at 135°–136° C. at 1.0–1.1 mm. pressure was recovered. This cut comprising 1,4,5,6,7,7-hexachloro-5-norbornen-2-ylacetyl chloride was obtained in 56% yield. It was analyzed with the following results. Calculated for $C_9H_5OCl_7$: Cl, 65.64. Found: Cl, 65.5. The compound crystallized on standing yielding crystals having a melting point of 48°–50° C.

In order to determine the fire retardancy, the adduct prepared according to the above paragraph, namely, 1,4,5,6,7,7 - hexachloro - 5 - norbornen - 2 - ylacetyl chloride, was dissolved in ether. A strip of filter paper which is cellulosic in nature was immersed in the solution and thereafter warmed to evaporate the ether. The filter paper was then heated to a temperature of about 200° C. The treated paper turned dark and when a flame was applied, burned at a very slow rate. Upon removal from direct contact with the flame, the flame of the paper was self-extinguished.

EXAMPLE II

In this example 1,4,5,6,7,7-hexachloro-5-norbornen-2-ylacetyl chloride is prepared according to the method set forth in Example I above. A portion of the crystals is dissolved in ether to which is added a small amount of sodium carbonate and a wetting agent. The cotton fabric to be treated is immersed for a period of about 30 seconds at room temperature in the solution following which the excess solution is expressed by padding the fabric. The fabric is then heated to 150° C. for 10 minutes. The treated fabric when exposed to the direct action of a flame burns at a very slow rate and upon removal from the direct contact of the flame proves to be self-extinguishing in nature.

EXAMPLE III

In this example 54 grams (0.1 mole) of hexachlorocyclopentadiene and 15 grams (0.1 mole) of vinylacetyl bromide are dissolved in 50 cc. of xylene and heated under reflux for a residence time of about 8 hours. At the end of this time the reaction mixture is subjected to fractional distillation under reduced pressure and the desired adduct comprising 1,4,5,6,7,7-hexabromo-5-norbornen-2-ylacetyl bromide is separated and recovered.

A solution of the above adduct dissolved in ether along with a small amount of sodium carbonate and a wetting agent is placed in a dipping trough following which a cotton swatch is immersed therein for a period of about 30 seconds at room temperature. Following this, the swatch is removed from the solution and the excess solution is removed by padding the fabric, which is then heated at 200° C. for 1 minute. The treated fabric when exposed to direct contact with a flame burns at a relatively slow rate and the flame of the material is self-extinguishing when removed from direct contact with the external flame.

EXAMPLE IV

In this example a prepolymer is prepared by condensing 103 grams (1.0 mole) of diethylenetriamine with 146 grams (1.0 mole) of adipic acid. The prepolymer is then further reacted with 376 grams (1.0 mole) of 1,4,5,6,7,7-hexachloro-5-norbornen-2-ylacetyl chloride to form a polymer which possesses an excellent physical property of flame retardancy.

EXAMPLE V

A polyester resin is prepared by charging 99 grams (1.3 moles) of propylene glycol to a reaction vessel which is then heated under a nitrogen blanket to a temperature of about 120° C. An adduct comprising 1,4,5,6,7,7-hexachloro-5-norbornen-2-ylacetyl chloride (0.4 mole) prepared in a manner similar to that set forth in Example I above is gradually charged to the reaction vessel which is maintained at a temperature of about 110° C. Upon completion of the addition of the adduct, the flask and contents thereof are then heated to a temperature of about 160° C. and maintained thereat for a period of about 8 hours. Following this, 40 grams (0.475 mole) of maleic anhydride is added to the reaction vessel which is thereafter maintained at a temperature of about 165° C. for an additional period of 8 hours. At the end of this time the resin which formed is recovered by pouring the same onto an aluminum foil. The solid resin will be ignited with difficulty when held in the flame of a Bunsen burner and will be self-extinguishing as soon as it is removed from the direct flame.

EXAMPLE VI

Other polymeric products such as alkyd resins may be prepared by admixing a halo-substituted cycloalkenylacyl halide such as 1,4,5,6,7,7-hexachloro-5-norbornen-2-ylacetyl chloride with glycerol, a dibasic acid such as phthalic anhydride and a fatty acid such as linseed oil to form oil-extended alkyd resins. These alkyd resins thus formed can be used as intermediates in paints and varnishes to impart finishes to objects which have a high hardness and gloss and which are water and alkali resistant. In addition, the finished product will also have excellent flame retardant properties.

Other plastics which may be prepared include polyurethane resins and foams in which a compound such as 1,4,5,6,7,7-hexachloro-5-norbornen-2-ylacetyl chloride is reacted with a polyol such as 1,2,6-hexanetriol. The resulting product is then admixed with toluene-2,4-diisocyanate to form a rigid white composition of matter which will be self-extinguishing when removed from direct contact with a flame.

We claim as our invention:

1. A process for the treatment of a polymeric substance selected from the group consisting of polyesters and polyamides containing hydrogen which is replaceable by reaction with an acid halide, said process comprising reacting said substance with a treating agent consisting essentially of a compound of the formula

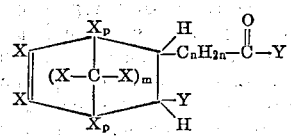

wherein X is hydrogen or halogen, at least one X being halogen; Y is hydrogen or lower alkyl; Z is halogen; $m$ is an integer of from 0 to 2; $p$ is 2 when $m$ is 0, and $p$ is 1 when $m$ is greater than zero; $n$ is an integer of from 0 to 2; and recovering the resultant treated substance.

2. The process of claim 1 wherein Z and at least one X are chlorine.

3. The process of claim 1 wherein Z and at least one X are bromine.

4. The process of claim 1 wherein said compound is 1,4,5,6,7,7-hexachloro-5-norbornen-2-ylacetyl chloride.

5. The process of claim 1 wherein said compound is 1,4,5,6,7,7-hexabromo-5-norbornen-2-ylacetyl bromide.

6. The process of claim 1 wherein said polymeric substance is a polyester.

7. The process of claim 1 wherein said polymeric substance is a polyamide.

8. The process of claim 1 wherein said polymeric substance is polyvinyl chloride.

9. The process of claim 1 wherein said polymeric substance is a polyurethane.

10. A process for the treatment of a textile material containing hydrogen which is replaceable by reaction with an acid halide, said process comprising reacting said material with a treating agent consisting essentially of a compound of the formula

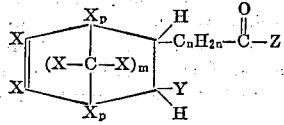

wherein X is hydrogen or halogen, at least one X being halogen; Y is hydrogen or lower alkyl; Z is halogen; $m$ is an integer of from 0 to 2; $p$ is 2 when $m$ is 0, and $p$ is 1 when $m$ is greater than zero; $n$ is an integer of from 0 to 2; and recovering the resultant treated material.

11. The process of claim 10 wherein Z and at least one X are chlorine.

12. The process of claim 10 wherein Z and at least one X are bromine.

13. The process of claim 10 wherein said compound is 1,4,5,6,7,7-hexachloro-5-norbornen-2-ylacetyl chloride.

14. The process of claim 10 wherein said compound is 1,4,5,6,7,7-hexabromo-5-norbornen-2-ylacetyl bromide.

15. The process of claim 10 wherein said textile material is cotton.

16. The process of claim 10 wherein said textile material is wool.

17. The process of claim 10 wherein said textile material is rayon.

18. The process of claim 10 wherein said textile material is leather.

References Cited

UNITED STATES PATENTS

| | | | |
|---|---|---|---|
| 1,451,331 | 4/1923 | Dreyfus | 8—120 |
| 1,698,049 | 1/1929 | Clarke et al. | 8—120 |
| 2,523,325 | 9/1950 | Putnam | 8—94 |
| 2,561,814 | 7/1951 | Novotny et al. | |
| 2,863,848 | 12/1958 | Robitschek et al. | |
| 2,812,347 | 11/1957 | Newcomer et al. | 260—544 XR |
| 3,062,776 | 11/1962 | Gaylord. | |
| 3,110,543 | 11/1963 | Koenig et al. | 8—128 |
| 3,305,391 | 2/1967 | Dunkel et al. | 8—133 XR |

FOREIGN PATENTS 872,558  7/1961  Great Britain.

NORMAN G. TORCHIN, *Primary Examiner.*

DONALD LEVY, *Assistant Examiner.*